Jan. 29, 1946.　　C. W. SCHOOLER　　2,393,823
FEEDER REEL FOR THRESHERS
Filed May 12, 1944　　3 Sheets-Sheet 1

Inventor
Charles W. Schooler
By
Herbert E. Smith
Attorney

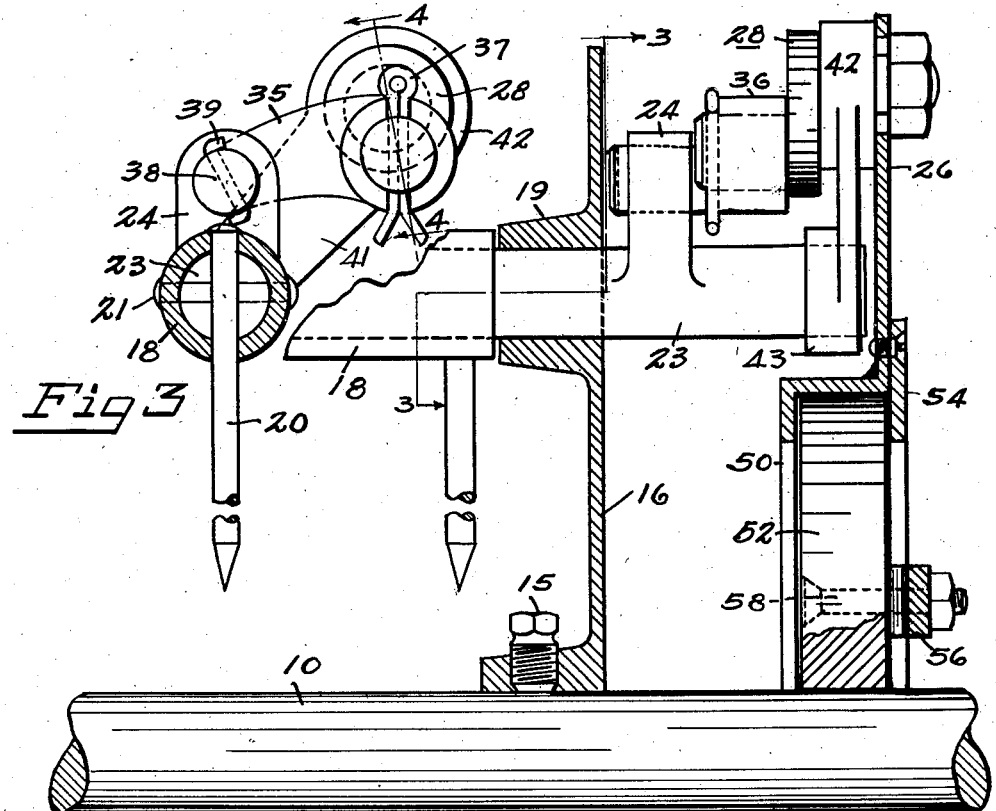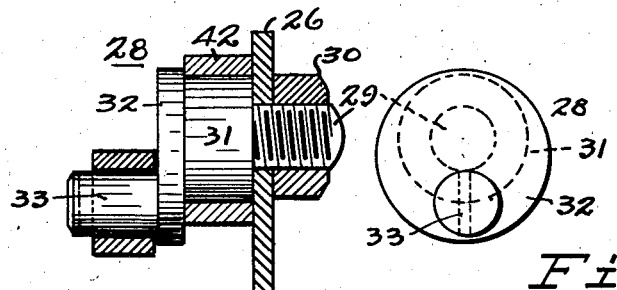

Jan. 29, 1946. C. W. SCHOOLER 2,393,823
FEEDER REEL FOR THRESHERS
Filed May 12, 1944 3 Sheets-Sheet 3
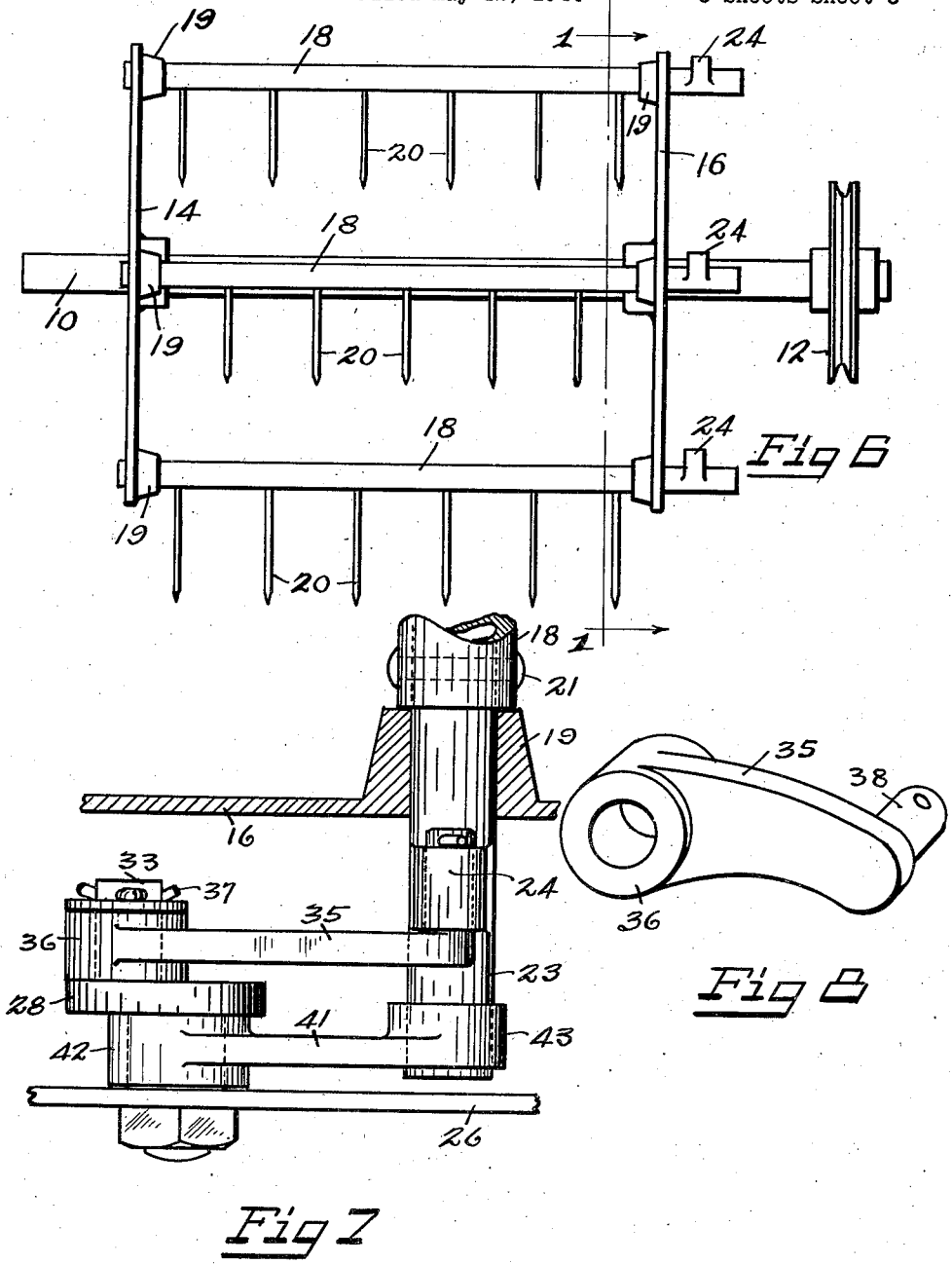

Patented Jan. 29, 1946

2,393,823

UNITED STATES PATENT OFFICE 2,393,823

FEEDER REEL FOR THRESHERS

Charles W. Schooler, Genesee, Idaho

Application May 12, 1944, Serial No. 535,346

3 Claims. (Cl. 198—223)

This invention relates to a feeder reel for threshers and, more particularly, to a reel to be used in connection with threshing machines for smoothing and evening the feed of grain bearing stalks to the cylinder.

In the prior art, it has been customary to feed harvested vegetation to the threshing cylinder by the use of drapers or feed belts or other more or less continuously operating mechanisms, which advance the vegetation from either its point of entry to the thresher or from some point from which other operations may have been conducted.

Often the matter being threshed arrives at the cylinder in bunches that will entangle mid the teeth of the cylinder and the concave and either tend to stop or reduce the efficiency of the threshing cylinder.

Having in mind the defects of the prior art, it is a prime object of this invention to provide a feeder reel which will function to even out and rake or comb the vegetation as it is fed to the threshing cylinder.

Another object of the invention is the provision in a feeder reel of the type described, of cycloidally moved tines which will have an accelerated motion during a portion of their travel in a more or less annular path.

A still further object of the invention resides in the provision of a novel crank and linkage mechanism for the operation of the cycloidally moved tines in a feeder reel.

The foregoing objects and others ancillary thereto I prefer to accomplish as follows:

According to the present embodiment of my invention, I mount for rotation near the tail end of a conveyor belt and adjacent the entrance to the concave and cylinder of the threshing machine, a rotary reel having a number of tine bars, each carrying a plurality of depending tines that operate in the vegetation flowing from the conveyor to the threshing cylinder. The reel comprises a shaft journaled for rotation and coupled with drive means, upon which shaft, in spaced apart relation to each other, is a pair of reel heads. Mounted near the periphery of the reel heads, and in suitable spaced relation thereabouts, are a plurality of tine bars, each of which is carried in rotation with the reel head and each of which may rock relative the reel head. Upon the rotary shaft of the reel, and outside one of the heads thereof, is a disc whose association with the rotary shaft is eccentric of its primary axis or center. Means are provided for adjustably securing the eccentric disc with relation to the shaft upon which it is mounted. A supplementary rotary head, lying substantially parallel to the reel head adjacent the eccentric disc, is mounted to rotate upon the said eccentric disc. This supplementary head carries a plurality of cranks securely locked thereto in a number equal to the number of tine shafts in the reel. The crank pin of each of these cranks in the supplementary head lies axisward of the supplementary head in every case. Between an upstanding ear on each tine bar and a crank pin, is a connecting link. Between the end of each tine bar and that portion of the crank which is eccentric to the crank pin, is a crank arm. By reason of this construction, rotary motion, applied to the heads of the reel, provides circular motion of the tine bar and its tines, with the latter at all times depending below the tine bar, in the manner of cycloidal mechanisms, with an additional accelerated swinging movement of the tine, during a portion of its travel in the circular path.

The novel features that I consider characteristic of my invention, are set forth with particularity in the appended claims. The invention, itself, however, both as to its organization and its method of operation, together with additional objects and advantages thereof, will best be understood from the following description of specific embodiments when read in connection with the accompanying drawings, in which:

Figure 2 is an enlarged sectional view taken on line 2—2 of Figure 1;

Figure 3 is a sectional view taken on line 3—3 of Figure 2;

Figure 4 is a sectional view taken on line 4—4 of Figure 3;

Figure 5 is an end view of a crank employed in my feeder reel;

Figure 6 is a view in elevation of the reel with portions omitted for convenience of illustration;

Figure 7 is an enlarged plan view of the crank mechanism of Figures 2 and 3; and Figure 8 is a view in perspective of a connecting link used in my crank mechanism.

Figure 1:
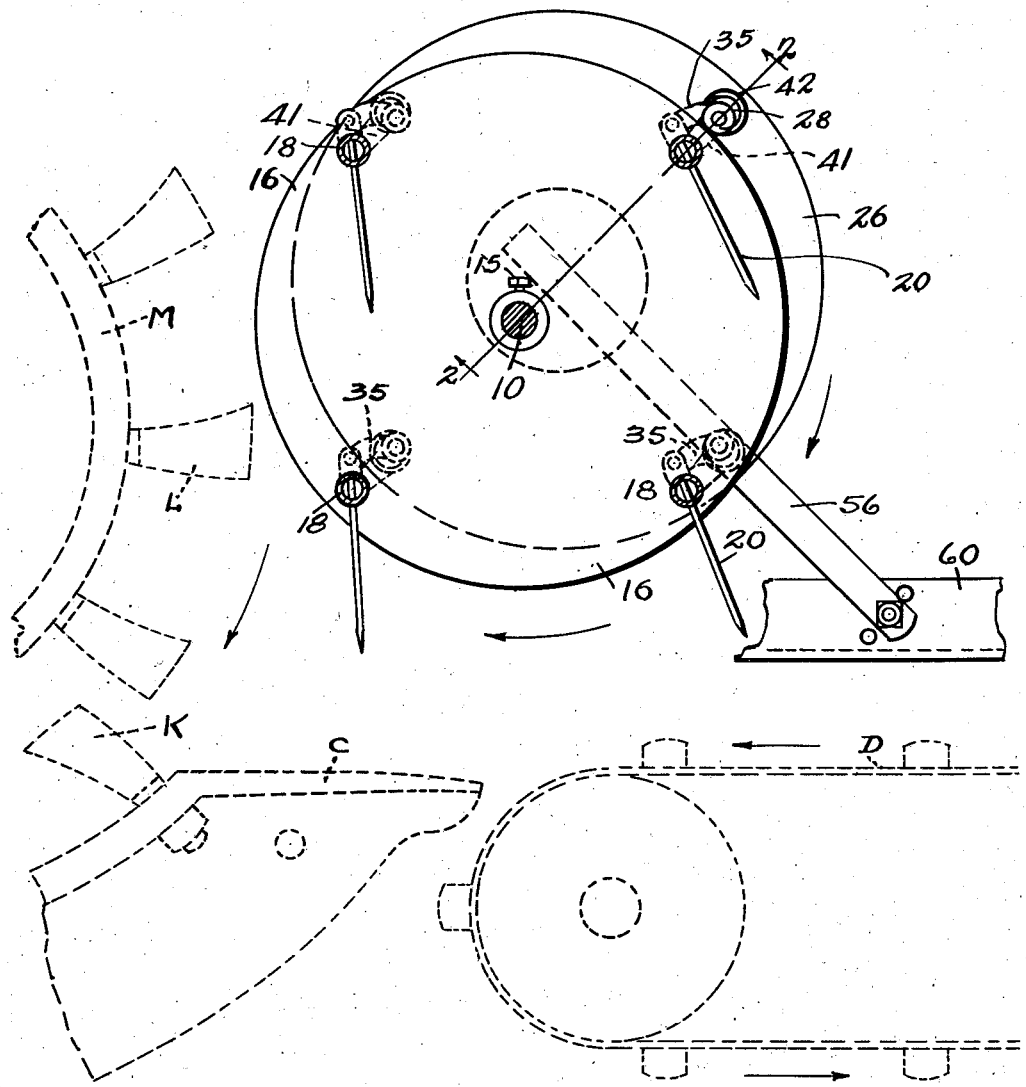
Figure 1 is a diagrammatic view illustrating the general relation of my reel to a conventional threshing mechanism.

Referring particularly to Figures 1 and 6 of the drawings, wherein is shown assembly views of my feeder reel, the numeral 10 designates the reel shaft, which is mounted in suitable journals in the housing of a conventional threshing machine. Rotation of the shaft 10 is obtained by applying power to the sheave 12, through belt drive means (not shown) of conventional nature.

Mounted in spaced apart relation upon shaft 10 is a pair of reel heads 14 and 16, here shown to be of circular shape, but which can obviously be in the form of radial arms or other similar constructions. These reel heads are locked to the shaft 10 by set screws 15.

Mounted between each pair of reel heads, near the periphery thereof and parallel to shaft 10, is a plurality of tine bars 18, which may rock in journals 19 of the reel heads. Each tine bar has a number of tines 20 that are secured as shown in Figure 3, and depend below their supporting bar. Coupled to each tine bar 18, by rivet 21, is a rock shaft 23, the major portion of which lies outside the reel head 16, as may be seen in Figure 2, which has the upstanding ear 24.

Lying outside of the reel and parallel to the reel head 16, is the supplementary or rocker head 26, which is of substantially the same size and shape as heads 14 and 16. As shown in Figures 4 and 5, a number of cranks 28 equal to the number of tine bars, are non-rotatably attached to the head 26, near its periphery by means of the stud 29 and nut 30. Each crank comprises: the bearing surface 31, crank arm 32 and crank pin 33, eccentric of the bearing surface 31. A connecting link 35 has loop 36 that is secured to the crank pin 33 by a cotter pin 37, and each link also has secured thereto the pin 38, which is locked in place in the upstanding ear 24 by means of a lock pin 39. A rock arm 41 has a loop 42 that encircles the bearing surface 31 of the crank and is free to move with relation thereto. The rock arm 41 is secured and rotatably coupled to the end of the shaft 23, by means of a collar 43.

The head 26 has a suitable cup 50, formed near its axis to enclose the disc 52, which is eccentrically mounted upon reel shaft 10 and which assembly is retained by means of the ring 54 shown in Figure 2. An arm 56 secured to the disc 52 by means of bolts 58, is anchored to the structural portion of the threshing housing at 60 to maintain the disc 52 in the desired position and to prevent rotation of the same with relation to the axis of shaft 10.

As may be seen in Figure 1, harvested vegetation is advanced towards the threshing cylinder by means of the draper D, which terminates adjacent the lip of concave C that supports concave teeth K relative to which the teeth L of the cylinder M swing to chop up and break loose the grain kernels from the ear or head of the grain.

As has been said before, the incoming vegetation carried by the draper D will often be in bunches and will seldom flow in a stream of substantially the same depth. This being the case, with my reel positioned over such a stream of vegetation, and with the tines rotating about the axis of the reel shaft, and at all times depending below their supporting tine bar 18, the larger bunches and wads of vegetation will be picked apart and raked into the concave and cylinder operating zone. As the tines descend, they are slightly inclined, as shown in Figure 1, and during their sweep through the bottom portion of their circular path, approach a more upright position, as suggested in the same figure. In other words, a slight acceleration takes place in the movement of the tine in its circular path, at or near the bottom thereof. This accelerated movement tends to kick the vegetation into the cylinder and aids in the withdrawal of the tine from the moving vegetation. As the tine withdraws and rises through the action produced by the arm 41, little or no tilting movement of the tine occurs. As the tine sweeps across the upper portion of its path, it is again progressively inclined in the manner suggested in Figure 1, in preparation for its re-entrance into the vegetation. The above described accelerated movement and angular adjustment of the tine during its rotary travel is produced by means of the connecting link 35, due to the rocking action by the fixed positioning of the crank pin 33, about which the axis of the tine shaft 18 rotates.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention, I claim:

1. A feeder reel, comprising: a reel shaft having a pair of spaced apart reel heads thereon, a plurality of tine bars rockably mounted in said reel heads and extending therebetween, tines depending from said tine bars, each tine bar having an upstanding ear, a disc eccentrically mounted upon the reel shaft outside one of said heads, means for retaining said disc against movement, a supplemental head journaled upon the periphery of said disc and lying alongside the adjacent reel head, a rock arm extending between each tine bar and the supplemental head with its ends connected to the bar and head, and a link connected to the upstanding ear of each tine bar and pivoted to the supplemental head axisward of the connection thereto of the rock arm.

2. A feeder reel, comprising: a reel shaft having a pair of spaced apart reel heads secured thereon, tine bars rotatably mounted in said reel heads and extending therebetween, a supplemental head mounted for eccentric rotation adjacent one of said reel heads externally of the reel, a rock arm connecting each tine bar to said supplemental head, and a connecting link pivotally attached to each tine bar radially outward therefrom and pivotally attached to the supplemental head radially inward from the point of connection of the adjacent rock arm thereto.

3. A feeder reel, comprising: a rotary shaft having a pair of reel heads secured thereon in spaced apart relation, a plurality of tine bars extending between and pivotally mounted in said reel heads, a supplemental head mounted for rotation eccentrically of said reel adjacent and externally one end thereof, a crank rigidly secured to the supplemental head adjacent each tine bar and having a crank pin radially inward from the point of attachment of the crank to the supplemental head, said crank including a bearing surface adjacent its point of attachment to the supplemental head, a rock arm attached to each tine shaft and having bearing means enclosing the bearing surface of the adjacent crank and a connecting link pivotally connected to each tine shaft radially outward from the axis thereof and pivotally connected to the crank pin of said crank.

CHARLES W. SCHOOLER.